United States Patent [19]
Huber et al.

[11] Patent Number: 6,051,133
[45] Date of Patent: Apr. 18, 2000

[54] INSTALLATION APPARATUS FOR A ROLLER DRIVE UNIT

[75] Inventors: Thomas Huber, Iffeldorf; Richard Holzner, Dorfen, both of Germany

[73] Assignee: Telair International GmbH, Hausham, Germany

[21] Appl. No.: 09/080,862

[22] Filed: May 18, 1998

[30] Foreign Application Priority Data

May 28, 1997 [DE] Germany ........................... 197 22 468
Jun. 12, 1997 [DE] Germany ........................... 197 24 941

[51] Int. Cl.⁷ .............................. B65G 13/06; B64C 1/22
[52] U.S. Cl. ...................... 210/171; 198/788; 244/137.1; 414/529
[58] Field of Search ..................................... 210/153, 171, 210/163–165; 198/494, 495, 788, 493; 244/137.1; 414/529, 532; 193/35 SS

[56] References Cited

U.S. PATENT DOCUMENTS

| | | | |
|---|---|---|---|
| 3,316,562 | 5/1967 | Van Dyke et al. | 210/163 |
| 3,978,975 | 9/1976 | Herbes et al. | 198/782 |
| 4,860,883 | 8/1989 | Knaul et al. | 198/495 |
| 4,930,612 | 6/1990 | Thorndyke | 193/35 SS |
| 5,042,645 | 8/1991 | Pritchard | 198/782 |

FOREIGN PATENT DOCUMENTS 0443060  8/1991  European Pat. Off. .

*Primary Examiner*—David A. Simmons
*Assistant Examiner*—Frank M. Lawrence
*Attorney, Agent, or Firm*—Howard & HOward

[57] ABSTRACT

An installation apparatus for a powered roller drive unit (11) to propel and convey objects, is provided wherein the roller drive unit is fixed to the floor (13) of an installation channel (12) of the apparatus. The installation apparatus includes a trough (14) attached to the floor (13), preferably in the region of and beneath the roller drive unit (11) for draining water.

13 Claims, 4 Drawing Sheets

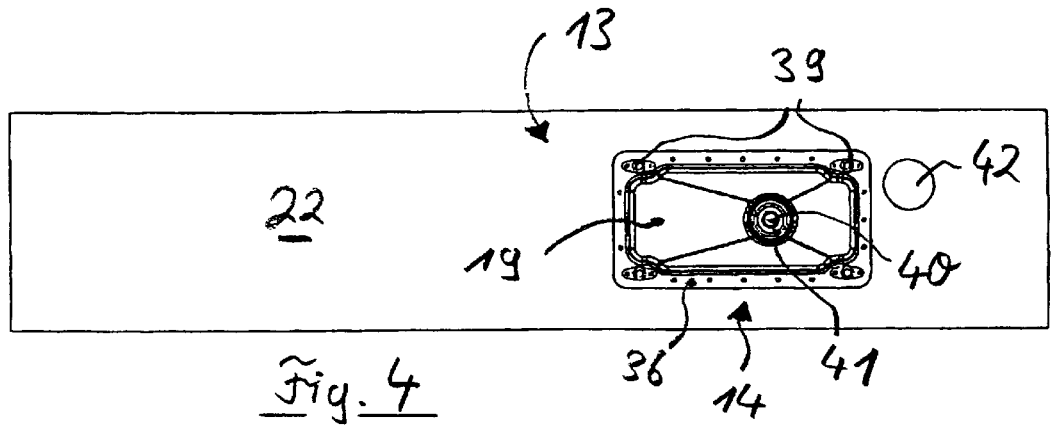
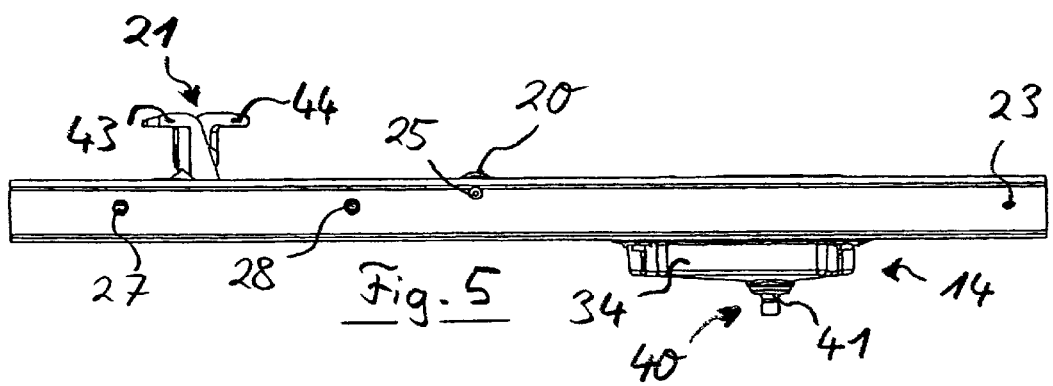
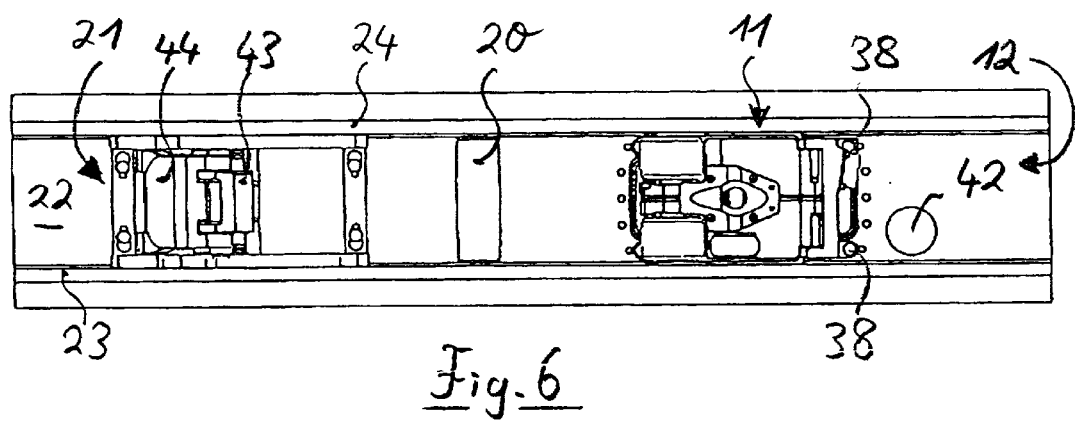
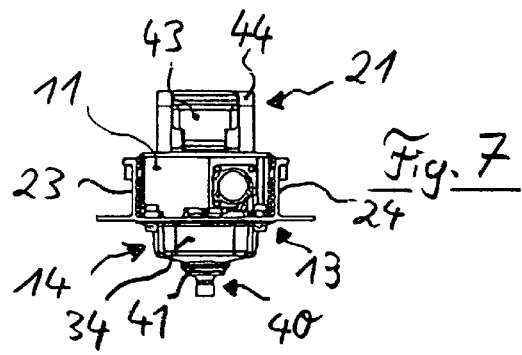

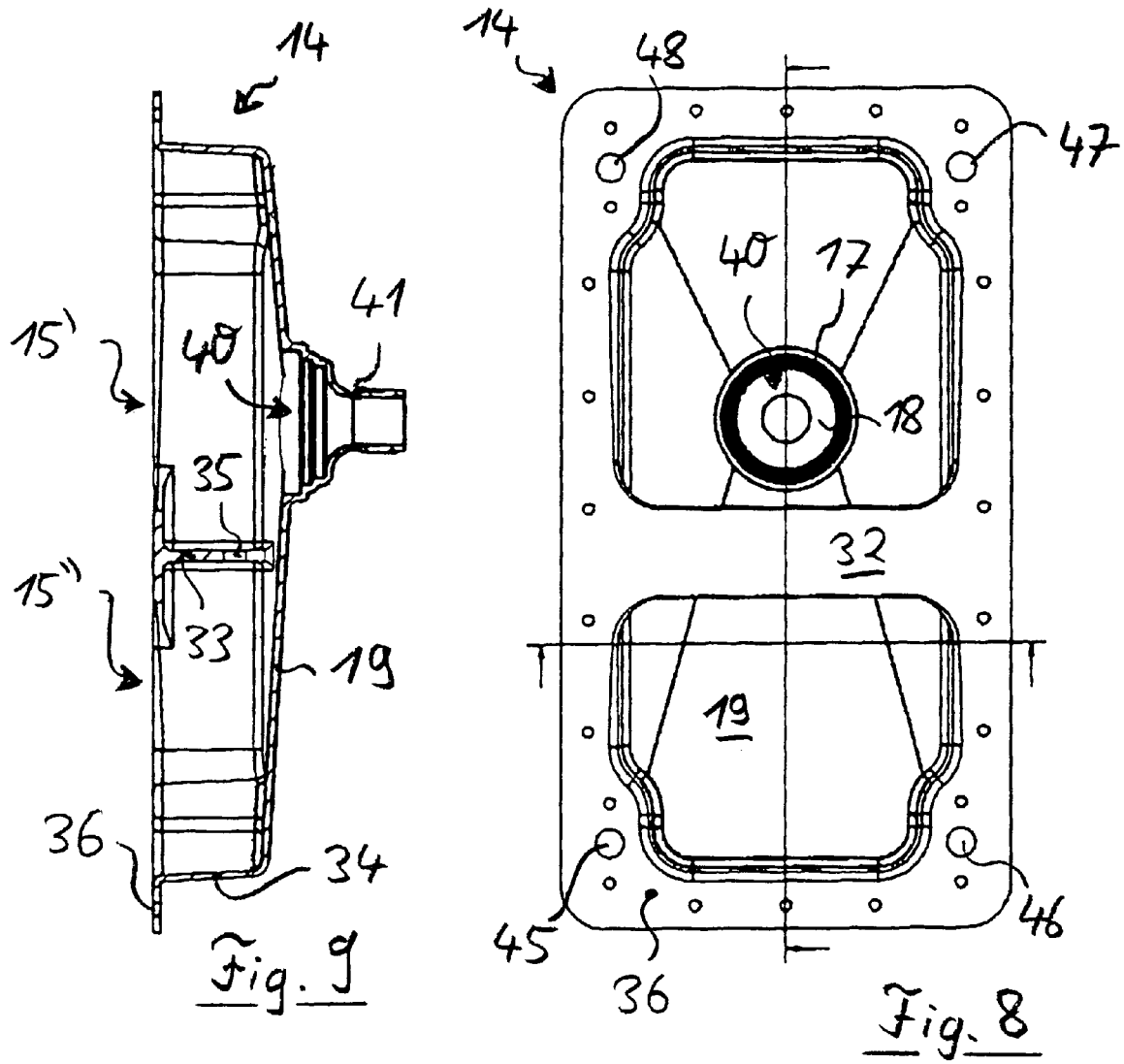
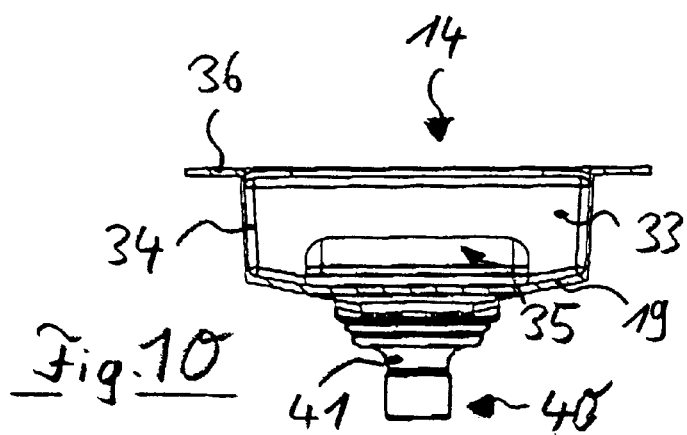

INSTALLATION APPARATUS FOR A ROLLER DRIVE UNIT

FIELD OF THE INVENTION

The present invention relates to an apparatus for installing a roller drive unit for the purpose of propelling and conveying objects, in particular cargo containers, on a roller-type conveyor track.

DESCRIPTION OF THE PRIOR ART

In principle it is desirable for such roller drive units to be capable of being installed in installation channels that can be fixed to the floor of an aircraft. However, this arrangement presents the problem that if water enters the aircraft, it can collect in the installation channel, especially if the installation channel is additionally blocked in the long direction by other components such as latches or other fixation devices. The collected water can cause one of the roller drive units to be "drowned", which may lead to mechanical and/or electrical malfunctions and damage the roller drive unit irreparably.

A similar problem exists with regard to the dirt that accumulates in an installation channel, which even in the dry state, but especially when combined with liquid runoff, can cause damage to the roller drive units.

SUMMARY OF THE INVENTION

The object of the present invention is to provide an installation apparatus with which the risk of malfunction of the roller drive unit in long-term use is reduced over that of the prior art.

According to the present invention there is provided an installation apparatus for a powered roller drive unit of the type used to propel and convey objects on a roller-type conveyor track, comprising channel means comprising a floor and side walls and defining an installation channel to the floor of which a powered roller drive unit can be attached; and a drainage means located in the floor and capable of draining away water that enters the installation channel.

Thus the invention comprises the provision of a drainage means at the bottom of the installation channel, preferably in the region of the roller drive unit, such that water and/or dirt that enters the installation channel can he removed.

The drainage means can comprise electrical or mechanical means such as pumps. However, it can also comprise simply the provision of an appropriate opening in the bottom of the installation channel.

Preferably, the drainage means comprises a trough disposed at the bottom of the installation channel, advantageously beneath the roller drive unit. The trough has a sufficient depth, such that water entering the installation channel immediately flows into and is collected in the trough. Dirt particles can also be caught in the trough in this way and as necessary (e.g. once a year) can be sucked out from above.

However, it is preferable to provide the trough with a drainage opening, where appropriate covered by a filtering means such as a sieve. This drainage opening allows liquid to flow downward and collect in the bilge region of the aircraft, from which it can be removed from time to time by valves routinely provided there. Advantageously, the drainage means, and preferably the trough, is provided a filtering means such as a sieve at its drainage opening so that the larger dirt particles are retained. In this regard, again, it is particularly useful for the drainage means to comprise a trough. Because the trough has a certain depth, water or other liquids can initially collect in the trough and build up a particular head of pressure over the filtering means situated at a low point therein. The liquid accumulates to such a depth that it produces a pressure sufficient to cause flow through the sieve or filtering means.

If the drainage opening is provided directly below the roller drive unit, without a trough, this effect cannot he achieved. Furthermore, in this less preferred embodiment without a trough, dirt also accumulates at a distance from the roller drive unit and is not collected at a specific point below it.

In order to provide access to the drainage mechanism so that dirt particles can be sucked out, the roller drive unit is advantageously mounted so that it can be rotated away, either upward or to the side.

Assembly of the roller drive unit and the trough in the installation channel is made especially simple when the roller drive unit and the trough are fixed to the floor of the installation channel by the same attachment means—for example, by the same bolts.

The invention will now be described by way of example with reference to the accompanying drawings.

BRIEF DESCRIPTION OF THE DRAWINGS

FIG. 4 shows the installation apparatus of FIG. 2 from below;

FIG. 5 is a side elevation of the installation apparatus of FIG. 2;

FIG. 6 is a plan view of the installation apparatus of FIG. 2;

FIG. 7 is a front elevation of the installation apparatus of FIG. 2;

FIG. 8 is a plan view of a drainage means forming part of the present invention in the form of trough;

FIG. 9 is a longitudinal sectional view of the trough along the line IX—IX in FIG. 8;

FIG. 10 is a transverse sectional view of the trough along the line X—X in FIG. 8.

DESCRIPTION OF THE PREFERRED EMBODIMENT

Figure 1:
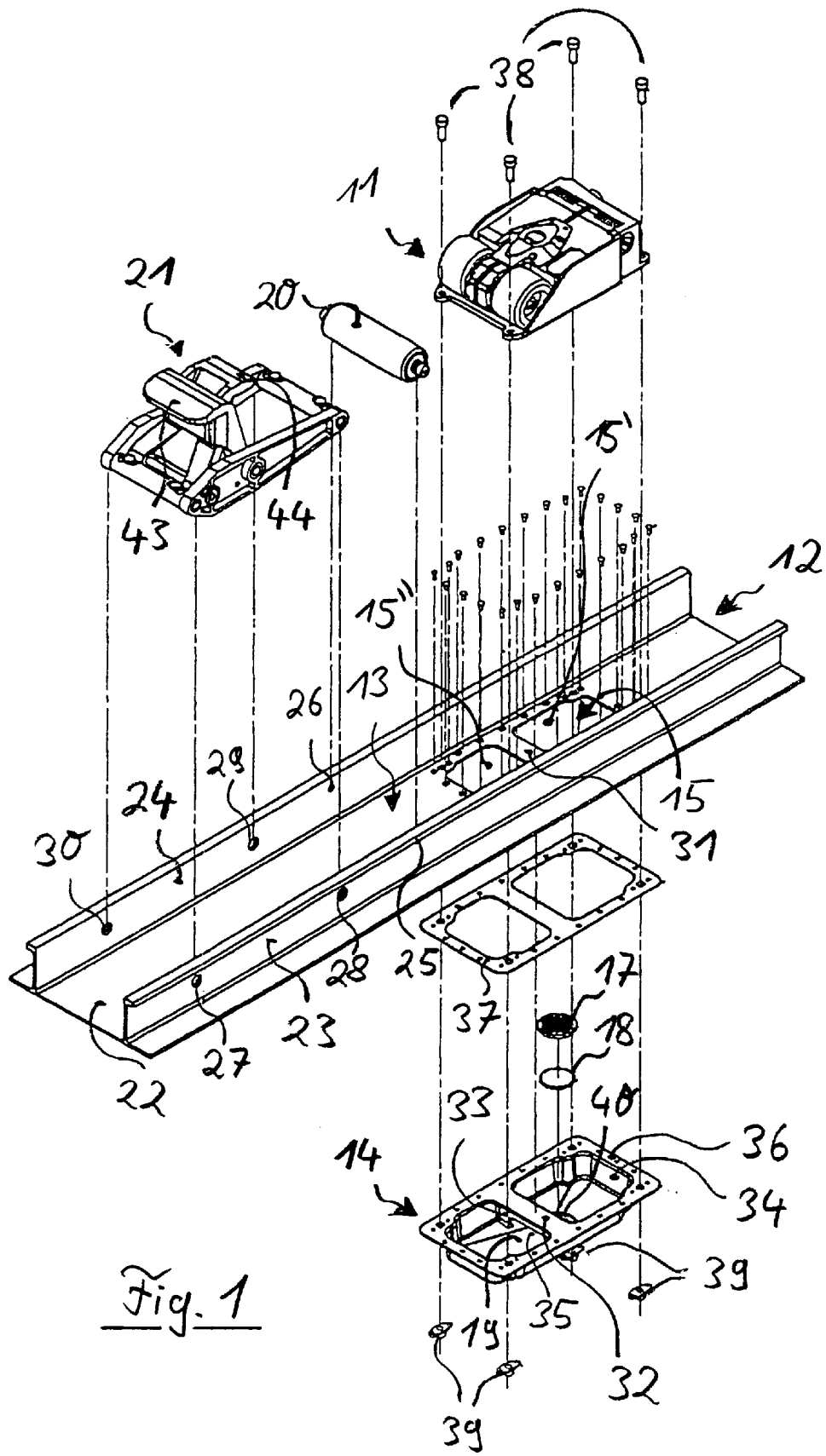
FIG. 1 is an exploded view of an exemplary embodiment of an installation apparatus in accordance with the invention along with a roller drive unit, a transport roller and fixation means.

FIG. 1 shows an embodiment of an installation apparatus in accordance with the invention, with a powered roller drive unit (PDU) 11, a transport roller 20 and a fixation means in the form of a latch 21, in an exploded view as seen diagonally from above. The installation apparatus comprises a floor plate 22 and two side ribs 23, 24 which together define a straight installation channel 12. The side ribs 23, 24 define between them a floor 13 on the floor plate 22 of the installation channel 12. On the floor 13 of the installation channel, which is open on its upward side, the above-mentioned roller drive unit 11 is mounted in a manner described below.

The transport roller 20 and the fixation means 21 are attached to the side ribs 23, 24 by way of bores 25, 26, 27, 28, 29, 30 in the side ribs. On the floor 13 of the installation channel 12, at the position where the roller drive unit 11 is installed, an opening 15 is provided. Across the opening 15 there is a bridge 31, which divides the opening 15 into a front part 15' and a back part 15". The bridge 31 stiffens the floor 13 of the installation channel 12 in the region of the roller drive unit 11.

Below the opening 15 a trough 14 can be attached. The trough 14 corresponds in its peripheral shape substantially to the shape of the bottom surface of the roller drive unit 11. On its upward-facing side, the trough is open except for a bridge 32 that corresponds in shape and position to the bridge 31 of the installation channel 12. The floor 19 of the trough on the side opposite to the open side, is funnel-shaped and tapers down to a deepest point. On its sides, the trough is delimited by a circumferential wall 34. Between the bridge 32 of the trough and the trough floor 19 a partition 33 is disposed, which divides the interior of the trough 14 into two compartments. The two compartments of the interior of the trough 14 communicate with one another by way of a sufficiently large opening 35 in the lower region of the partition 33.

The upper edge of the trough bends outward to form a surface which, together with the bridge 32, has approximately the shape of a nearly rectangular figure eight. By way of this rim surface 36 and a correspondingly shaped gasket 37, the trough 14 can be attached from below to the floor 13 of the installation channel 12, so that it covers the region of the opening 15.

The attachment of the trough 14 to the installation channel 12 is initially achieved by riveting the rim surface 36 to the floor 13 of the installation channel, with interposition of the gasket 37. After the trough 14 has been thus attached to the installation channel 12, the roller drive unit 11 can be attached by means of bolts 38 that pass through corresponding openings in the floor 13 and in the gasket 37 and bores 45, 46, 47, 48 in the rim surface 36 and are secured below the rim surface 36 by means of corresponding nuts 39.

At the deepest point en the floor 19 of the trough a drainage opening 40 is disposed, which here consists of a substantially funnel-shaped outlet. Inserted into the drainage opening 40 are a filter 18 and a sieve 17, one above the other.

Figure 2:
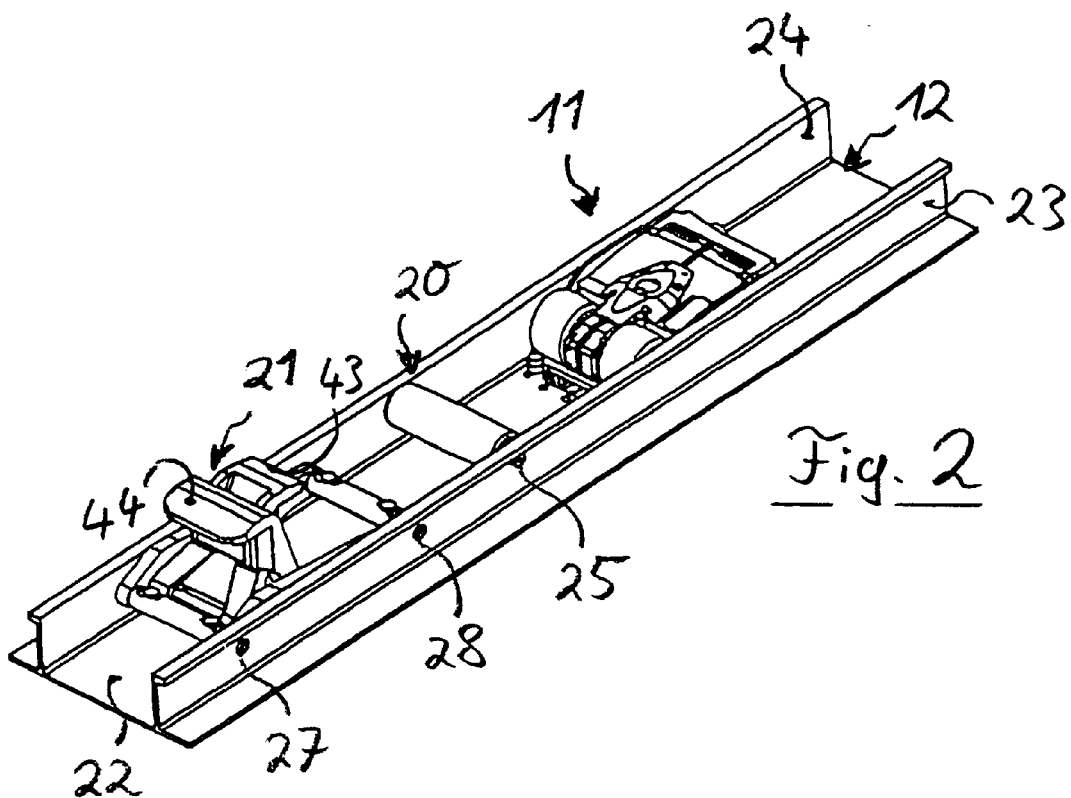
FIG. 2 shows the installation apparatus with roller drive unit, transport roller and fixation means of FIG. 1 in an assembled state, as viewed in perspective diagonally from above.

In FIG. 2 the installation apparatus of FIG. 1 is shown in the assembled state. The fixation latch 21 and the transport roller 20 are attached to the side ribs 23, 24 of the installation channel 12. The roller drive unit 11 is fixed to the floor 13 and the trough rim surface 36 by means of the bolts 38 and nuts 39 (FIG. 1).

Figure 3:
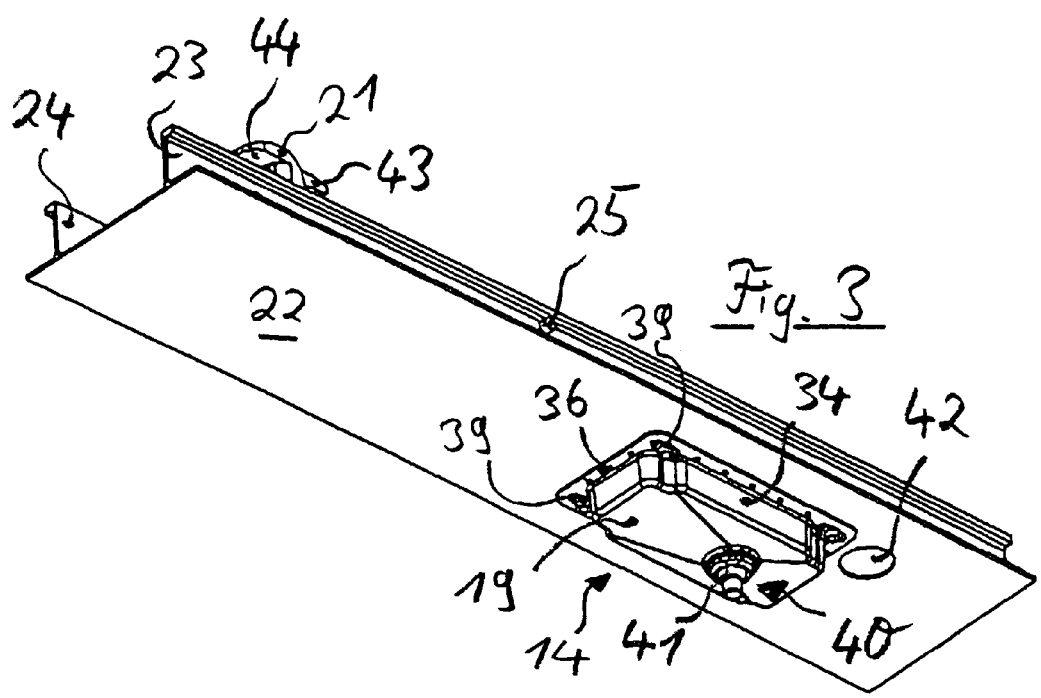
FIG. 3 shows the installation apparatus of FIG. 2 in perspective as viewed diagonally from below.

In FIG. 3 the installation apparatus of FIG. 2 is shown in perspective, as viewed diagonally from below. The drainage opening 40 of the trough 14 is formed by a funnel-shaped nozzle 41, which is disposed at the deepest point in the trough floor 19. As can be seen in FIG. 3. an aperture 42 has been made in the floor 13 of the installation channel 12, in the region next to the trough 14. This aperture 42 can be used as a passageway for cables connected to the roller drive unit 11, but can be closed in a leakproof manner with a corresponding sealing cap (not shown), either when the connecting cables are in place or in the absence of connecting cables.

FIG. 4 shows the installation apparatus of FIG. 2 from below, so that the underside of the installation channel 12 and the underside of the trough 14 are visible. The trough 14 is substantially rectangular in outline, the four corners being slightly indented so as to make room for the nuts 39 that, secure the bolts 38 that pass through the trough rim surface 36. The nuts 39 are plate nuts, preferably of the self-locking type, which connect the trough 14 to the gasket 37, the provision of which is optional, and the channel 12. This arrangement facilitates the installation or removal of the roller drive unit 11, because during these actions the channel can remain installed in the aircraft.

In FIG. 5 the installation apparatus of FIG. 2 is shown from the side. Projecting upward out of the installation channel 12 are locking elements 43, 44 of the fixation device 21, as well as a small region of the transport roller 20. On the under surface, the trough 14 makes planar contact with the floor 13.

In FIG. 6 the installation apparatus of FIG. 2 is shown from above. This view makes visible the upper surfaces of the elements disposed in the installation channel 12, namely the fixation device 21, the transport roller 20 and the roller drive unit 11.

In FIG. 7 the installation apparatus of FIG. 2 is shown from the end near which the trough is attached. Accordingly, the roller drive unit 11 is visible, along with its attachment to the floor of the installation channel 12 and the trough rim surface 36 by means of bolts 38 and nuts 39. Behind the roller drive unit 11 is disposed the fixation latch 21, of which only the projecting locking elements 43, 44 can be seen here.

FIG. 8 is an enlarged drawing of the trough 14 as see n from above. In the rim surface 36 there are numerous bores through which the trough 14 can be riveted to the installation channel 12. The four larger bores 45, 46, 47, 48 in the region of the outer corners of the rim surface 36 are, as mentioned above, provided to receive the bolts 38. The funnel-shaped tapering of the trough floor 19 is achieved here by joining four planar floor components together in an appropriate configuration. However, the trough floor could also be made of a single plate so shaped as to taper towards a deepest point.

FIG. 9 is a longitudinal section along the line IX—IX in FIG. 8. This drawing shows the circularly symmetrical, funnel-shaped nozzle 41 that surrounds the drainage opening 40. In the upper, wider part of the funnel-shaped nozzle 41 the sieve 17 and the filter 18 are disposed one above the other. In the interior of the funnel-shaped nozzle 41 appropriate seatings for the circular sieve 17 and the circular filter 18 are formed.

In FIG. 10 a transverse section along the line X—X in FIG. 8 is shown. This sectional view shows the partition 33 disposed below the bridge 32, which forms part of the trough rim surface 36. The opening 35 in the partition 33, which connects the two compartments inside the trough 14, is also visible. This partition has a dual function. It serves to stiffen the trough 14, and it also counteracts the tendency of the liquid to slop or "slosh" that can be expected when the aircraft is flying.

What is claimed is:

1. An installation apparatus for a powered roller drive unit used to propel and convey objects on a roller conveyor track, comprising channel means comprising a floor and side walls and defining an installation channel to the floor of which a powered roller drive unit is attached; and a drainage means located in the floor and capable of draining away water that enters the installation channel, a roller drive unit mounted above the drainage means in such a way as to provide access to the region therebeneath for cleaning purposes, said drainage means including a trough attached to said floor of the installation channel by a fixing means which is the same fixing means as is used to mount the roller drive unit on the apparatus.

2. An installation apparatus as set forth in claim 1 wherein said trough is funnel-shaped.

3. An installation apparatus as set forth in claim 1 wherein said floor includes an opening with a bridge extending thereacross.

4. An installation apparatus as set forth in claim 1 including fasteners sandwiching said roller drive unit and said trough to said floor.

5. An installation apparatus for a powered roller drive unite for propelling and conveying objects on a roller conveyor track, comprising;

channel means comprising a floor and side walls and defining an installation channel to the floor of which said powered roller drive unit is attached;

a drainage means located in the floor and capable of draining away water that enters the installation channel;

wherein the drainage means comprises at least one drainage opening at a low-lying point.

6. An installation apparatus as claimed in claim 5, wherein the drainage means comprises a trough.

7. An installation apparatus as claimed in claim 5, wherein the drainage means defines at least one drainage opening at a low-lying point.

8. An installation apparatus as claimed in claim 5, wherein the drainage means comprises a floor that tapers to defines a funnel shape.

9. An installation apparatus as claimed in claim 5, wherein the drainage means comprises a filter means such that larger dirt particles are thereby retained.

10. An installation apparatus as claimed in claim 5 in combination with a roller drive unit mounted thereon in a region above the drainage means in such a way as to provide access to the region therebeneath for cleaning purposes.

11. An installation apparatus used to propel and convey objects on a conveyor track, comprising;

channel means comprising a floor and side walls, a powered roller drive unit attached to said floor; and a drainage trough attached to said floor for draining away water that enters said channel.

12. An installation apparatus as claimed in claim 6, wherein an outer rim surface of the trough corresponds to an outline of the roller drive unit.

13. An installation apparatus as claimed in claim 10, wherein the drainage means comprises a trough attached to the floor of the installation channel by a fixing means which is the same fixing means as is used to mount the roller drive unit on the apparatus.

* * * * *